(12) United States Patent
Franz et al.

(10) Patent No.: US 6,287,102 B1
(45) Date of Patent: Sep. 11, 2001

(54) EXTRUDER WITH A SHAPING DEVICE

(75) Inventors: Pürstinger Franz, Traun; Weiermayer Leopold, Schlierbach, both of (AT)

(73) Assignees: C.A. Greiner; Sohne Gesellschaft m.b.H., both of Kremsmunster (AT)

( * ) Notice: Subject to any disclaimer, the term of this patent is extended or adjusted under 35 U.S.C. 154(b) by 0 days.

(21) Appl. No.: 09/117,472

(22) PCT Filed: Jan. 28, 1997

(86) PCT No.: PCT/AT97/00013

§ 371 Date: Jul. 29, 1998

§ 102(e) Date: Jul. 29, 1998

(87) PCT Pub. No.: WO97/27991

PCT Pub. Date: Aug. 7, 1997

(30) Foreign Application Priority Data

Jan. 30, 1996 (AT) ........................................ 164/96

(51) Int. Cl.[7] ................................................. B29C 47/90

(52) U.S. Cl. ............................ 425/71; 425/384; 425/388; 264/209.4

(58) Field of Search ............................ 425/71, 388, 392, 425/326.1, 384; 264/209.4, 209.5

(56) References Cited

U.S. PATENT DOCUMENTS

| | | | |
|---|---|---|---|
| 3,169,272 | * 2/1965 | Maxson | 18/14 |
| 3,212,135 | * 10/1965 | Branscum | 18/14 |
| 3,229,005 | * 1/1966 | Reifenhauser | 264/47 |
| 3,473,194 | * 10/1969 | Farrow | 425/71 |
| 3,538,210 | * 11/1970 | Gatto | 264/90 |
| 3,546,745 | * 12/1970 | Ball | 18/14 |

(List continued on next page.)

FOREIGN PATENT DOCUMENTS

| | | |
|---|---|---|
| 1 201 038 | 9/1965 | (DE) . |
| 1 504 701 | 4/1970 | (DE) . |
| 1 923 490 | * 11/1970 | (DE) . |
| 2 214 543 | 10/1972 | (DE) . |
| 22 10 657 B2 | * 9/1973 | (DE) . |
| 22 10 657 | 9/1973 | (DE) . |
| 2 404 123 | 1/1974 | (DE) . |
| 2 239 746 | * 2/1974 | (DE) . |
| 30 13 020 A1 | 10/1981 | (DE) . |
| 195 04 981 A1 | 8/1995 | (DE) . |
| 0 237 723 A2 | 1/1987 | (EP) . |
| 0 487 778 B1 | * 11/1990 | (EP) . |
| 0 659 536 A2 | * 12/1994 | (EP) . |
| 0 659 537 A2 | * 12/1994 | (EP) . |
| 1 201 451 | * 12/1959 | (FR) . |
| 6 110 228 | 5/1986 | (JP) . |

OTHER PUBLICATIONS

Michaeil, Walter, *Extrusions—Werkzeuge für Kunststoffe und Kautschuk*, pp. 321–329, (No date).

*Primary Examiner*—Robert Davis
*Assistant Examiner*—Joseph S Del Sole
(74) *Attorney, Agent, or Firm*—Alston & Bird LLP

(57) ABSTRACT

The invention describes an extrusion system (1) with a shaping device (3), which has at least one calibrating device (9) comprising in particular a plurality of calibrating tools disposed in succession in the extrusion direction. The calibrating device (9) and/or the calibrating tools (24,31 to 33) are provided with cooling ducts (49) for passage of a heat treatment agent (50). The shaping device (3) has mould surfaces for application against an article (6) to be passed through. Furthermore, at least between an extrusion tool (8) of the shaping device (3) and the immediately succeeding calibrating tool in the extrusion direction and/or between the first calibrating tool (24) and at least one further calibrating tool (31,32,33), a seal device is disposed closing off the article (6) to be passed through in the region of its outer surfaces (48) from the environmental pressure, in order to form a cavity (38 to 41).

16 Claims, 8 Drawing Sheets

U.S. PATENT DOCUMENTS

| | | | | |
|---|---|---|---|---|
| 3,668,288 | * | 6/1972 | Takahashi | 264/47 |
| 3,891,379 | * | 6/1975 | Lenk | 425/464 |
| 3,911,251 | * | 10/1975 | Day | 219/523 |
| 4,181,487 | * | 1/1980 | Kessler | 425/326.1 |
| 4,543,051 | * | 9/1985 | Maillefer | 425/71 |
| 4,626,398 | * | 12/1986 | Vetter et al. | 264/566 |
| 4,808,098 | * | 2/1989 | Chan et al. | 425/72.1 |
| 4,952,366 | * | 8/1990 | Gelin | 264/511 |
| 5,460,773 | * | 10/1995 | Fritz et al. | 264/544 |
| 5,514,325 | * | 5/1996 | Purstinger | 264/560 |
| 5,516,270 | * | 5/1996 | Lehtinen | 425/71 |

* cited by examiner

EXTRUDER WITH A SHAPING DEVICE

FIELD OF THE INVENTION

The invention relates to an extrusion system with a shaping device.

BACKGROUND OF THE INVENTION

Shaping devices are already known by means of which extruded articles, particularly hollow profiles or pipes, emerging from an extruder nozzle, are calibrated to desired outer and inner dimensions and are hardened at the desired outer dimensions or, in order to obtain the desired intrinsic rigidity, are cooled to the temperature provided for that purpose. Such shaping devices are known from the book by Walter Michaeli, Extrusions-werkzeuge für Kunststoffe und Kautschuk", from Carl Hanser Verlag, Munich/Vienna, second fully revised and expanded edition, published 1991, particularly pages 321 to 329. Shown on page 323 is an external calibration with vacuum, in which the extrudate emerging from the extrusion tool is introduced in the form of a hollow profile at some distance after emergence from the nozzle lip of the extruder tool into a calibrating tool, by means of which the extrudate is passed through in the area of its surrounding outer surface, in contact with the mould surfaces of the calibrating tool. The contact without clearance of the surface of the extrudate on the individual mould surfaces of the calibrating tool is achieved by air passages, particularly slots located in the mould surfaces, and which are connected by supply lines to a vacuum source. In order to cool the extrudate, the calibrating tools are provided with one or more surrounding ducts for a heat treatment agent, and the vacuum can increase in the individual air passages or slots as the distance from the nozzle lip of the extruder tool increases. The temperature of the heat treating agent, in contrast to the mass temperature of the extruded profile, is extremely low and comes to about 20° C. Connecting then to such so-called dry calibrators are usually one or more cooling baths, in which the sufficiently rigid profiles, with partial application of vacuum or wetting via spray nozzles or passage through water baths, are cooled to room temperature. In many cases sufficient surface quality of the extrudates produced cannot be achieved with such calibrating tools over a lengthy service life of the shaping device.

A further device for calibrating extruded profiles, particularly extruded hollow profiles of thermoplastics, has become known from DE 22 39 746 A, in which there is located at a spacing in the extrusion direction behind the extruder tool or injection head of the plastics worm extruder press, a vacuum calibrating device with a cooling device integrated therein. In connection with the vacuum calibration device there is provided a low-pressure calibration tank through which a coolant flows, the vacuum calibrating device being so designed that therein only the outer skin and any present outer profile portions such as fine contours of the profile to be calibrated are shaped into their final form. The residual heat still contained in the profile is removed by the coolant in the low pressure calibration tank. Located in the vacuum calibrating device are individual calibrating plates at a spacing from one another, which thus form cavities in the form of vacuum slots, through which the extruded article is suctioned with the aid of the applied vacuum against the mould surfaces of the individual calibrating plates. In the calibration device proposed here, in all cases of application perfect surface quality of the extruded article and a long service life of a device could not be achieved.

SUMMARY OF THE INVENTION

The object underlying the present invention is to achieve, even at high throughputs, a perfect and constant surface quality of the extrudates produced, particularly of window profiles or pipes or the like, without increasing the outlay on machinery.

This object of the invention is achieved by providing a shaping device for an extrusion system comprising an extrusion tool and a calibrating device having a plurality of calibrating tools arranged one after another along an extrusion direction in which an extruded article from the extrusion tool travels through the calibrating device, wherein a seal device is disposed between an end face of the extrusion tool and an upstream end face of the first calibrating tool, and between the downstream end face of each calibrating tool and the upstream end face of an immediately succeeding calibrating tool, the seal devices being structured and arranged to surround the outer surface of the extruded article and to maintain a space in the extrusion direction between the respective end faces between which the seal device is disposed so as to create a cavity surrounding the extruded article that is closed off from environmental pressure outside the calibrating device, whereby the cavity can be evacuated to a reduced pressure relative to the environmental pressure. The surprising advantage of this solution resides in the fact that, simultaneously with a reduction in the outlay for construction and servicing the calibrating tools, the surface quality can be considerably increased, avoiding air passages or cavities for application of vacuum to the profile in the calibrating tools. In a way which could not be foreseen and was totally surprising to the person skilled in the art, in this way however higher dimensional exactitude of the extrudate could be achieved, as the extrudate, after emerging from the nozzle lip of the extruder tool, is no longer exposed to environmental conditions. By means of the direct transfer of the extrudate from the extruder tool into the calibrating tools, sinking of the outer peripheral surfaces by means of a web located there under or within the profile, is avoided, as the external air pressure cannot become directly effective on the outer surface. This however effects in an unforeseeable way rapid precipitation of lubricants or a condensation of lubricant residues, such for example as the waxes or the like mixed with the raw materials, which, due to the high temperatures in this area, are still liquid. In this way the service life of such tools between the individual cleaning procedures is considerably increased without a disadvantageous alteration in surface quality, as contamination in the inlet area of the calibrating tools is prevented by removal of the superfluous lubricants, and contamination in the mould surfaces of the individual calibrating tools is avoided by the elimination of air passages in the predominant area of the mould surfaces of the calibrating tool.

In addition to the seal from external environmental conditions, vacuum or low pressure is applied directly to at least one of the cavities, and the article is cooled immediately thereafter. In this way lubricant residues and precipitated additives such as waxes can be directly removed by the applied vacuum, when adequate temperatures are maintained. Thus the service life of such tools between the individual cleaning procedures is considerably increased without disadvantageous alteration in the surface quality, as contamination in the inlet area of the calibrating tools is prevented by the removal of superfluous lubricants, and contamination in the mould surfaces of the individual calibrating tools is avoided by the elimination of air passages in the predominating area of the mould surfaces of the calibrating tool.

By providing the cavities delimited by the end faces of the calibrating tools and the seal devices, vacuum slots in the mould surfaces can be omitted, whereby formation of smearing by the smooth continuous mould surfaces is avoided, and the respectively required polished effect can be simply achieved on the surface of the article.

It is also advantageous to make the lengths of the mould surfaces in the extrusion direction at least seven times the distance between the nozzle lip of the extrusion tool and the first calibrating tool and the distance between adjacent calibrating tools, as in this way hardening, shaping and smoothing of the surface of the article and an improved quality and lower build-up of tension in said article can be achieved by the gentle smooth cooling and guidance of the article.

By providing each of the cavities with its own line for evacuating the cavity, evacuation is achieved of the individual cavities, if necessary also with a differing degree of low pressure.

Advantageously, the first calibrating tool and the next succeeding calibrating tool are connected to each other so as to permit relative movement therebetween in the extrusion direction. This permits a continuous length compensation by means of the relative movement of a calibrating tool, caused by differing extrusion speeds or extrusion temperatures, so that faults in the article or in its surface can be reliably eliminated.

Furthermore, the processing costs, and above all also the volume of the cavities for applying the vacuum, can be reduced by the design according to the invention. In this way universal adaptation of the width extending in the extrusion direction of the cavities serving as vacuum slots, is possible in a simple way. Adjustment of the width of these cavities can be effected manually or automatically by displacement of individual calibrating tools relative to the calibrating table.

By forming the line for the cavity immediately succeeding the extrusion tool at least partially in the extrusion tool, a disturbance-free withdrawal of additives or lubricants or the like, which are only liquid at higher temperatures, is made possible without these forming a blockage during extraction, thus blocking the line.

An improved surface quality or quality of the cover layer can be achieved by providing an inlet for supplying a flushing agent into the cavity immediately succeeding the extrusion tool, as residues of lubricants or additives adhering more strongly to the surface of the hot article, which is still plastic, can be perfectly removed and extracted.

By providing elastically deformable seal devices between the extrusion tool and the first calibrating tool and between adjacent calibrating tools, temperatures altering during operation and the thermal expansions caused thereby can be compensated for without mechanical readjustment of the extrusion system.

A simple adaptation to differing spaces of the cavities and a vacuum of varying intensity applied in these cavities, can be achieved by constructing the seal devices as inflatable seals that are pressurized by a pressure supply system cooling of the surface layers or coatings of the article and thus a good dimensional stability are achieved.

BRIEF DESCRIPTION OF THE DRAWINGS

The invention will now be explained in more detail in the following with reference to the embodiments given by way of example and shown in the drawings, which show.

DETAILED DESCRIPTION OF PREFERRED EMBODIMENTS

It should be noted at the outset that in the various embodiments described identical parts are provided with identical reference numbers or identical component titles, the disclosures contained in the entire description being meaningfully capable of transfer to identical parts with identical reference numbers of identical component titles. Furthermore, individual ones from the various embodiments shown can in themselves represent independent solutions according to the invention.

Figure 1:
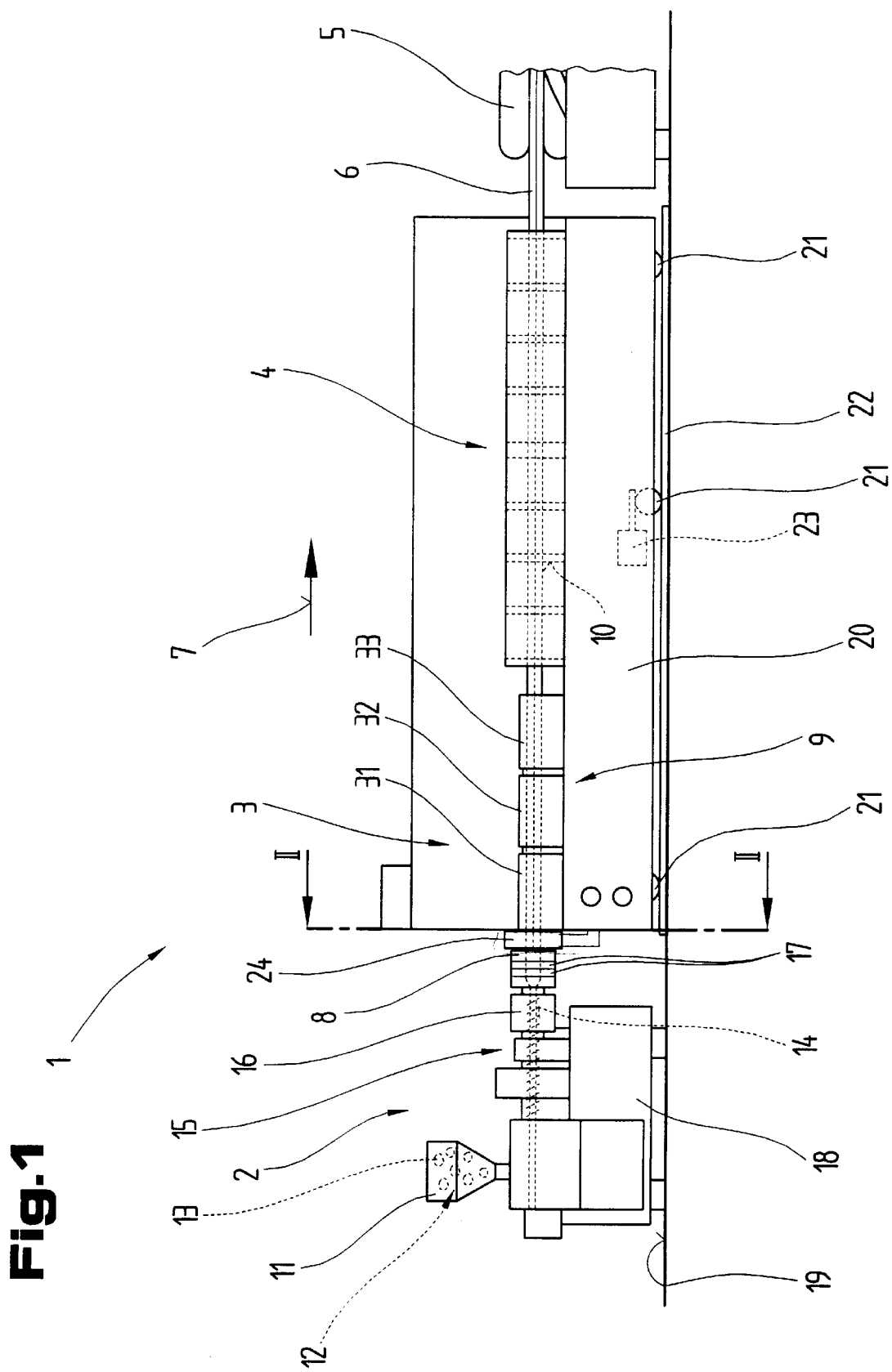
FIG. 1: an extrusion system with a shaping device according to the invention in side view and in a simplified schematic illustration.

FIG. 1 shows an extrusion system 1, which consists of an extruder 2, a shaping device 3 following it, and following this a cooling device 4 which can also if necessary represent a calibrating device, and following this again a caterpillar pull-off 5 for an extruded article 6. The caterpillar pull-off 5 serves to draw off the article 6, for example a profile of plastic for window construction, in the extrusion direction, arrow 7, starting from the extruder 2, through the shaping device 3 and the cooling device 4. In this embodiment the shaping device 3 consists of an extrusion tool 8, a calibrating device 9 and calibrating plates 10 in the cooling device 4. The calibrating plates 10 however can also serve purely as support plates for the article 6.

In the area of the extruder 2 there is located a storage container 11, in which there is stored a material 12 such for example as a plastic 13, which is passed to the extruder 2 by a conveyor worm 14. The extruder 2 also comprises a plasticising unit 15, by means of which, during passage of the material 12 through it, by means of the conveyor worm 14, and if necessary additional heating devices 16, the material 12 in accordance with its inherent properties, under pressure and if necessary the application of heat, is heated and plasticised and conveyed in the direction of the extruder tool 8. Before entry into the extruder tool 8, the mass flow of plasticised material 12 is passed in transition zones 17 to acquire the desired profile cross-section.

The extruder tool 8 with the plasticising unit 15 and the storage container 11 are supported or secured on a machine bed 18, the machine bed 18 being mounted on a plane support surface 19, such for example as a factory floor.

The calibrating device 9 with the subsequent cooling device 4 is located or secured on a calibrating table 20, said calibrating table 20 being supported on rollers 21 on a rail 22 secured on the support surface 19. This mounting of the calibrating table 20 via the rollers 21 on the rail 22 serves to enable the entire calibrating table 20 with the devices and arrangements located thereon, to be displaced in the extrusion direction, arrow 7, towards or from the extruder tool 8. In order to be able to execute this displacement movement more simply and precisely, for example there is associated with one of the rollers 21 a displacement drive 23, as indicated schematically in dotted lines, and which enables deliberate and controlled longitudinal movements of the calibrating table 20 towards the extruder 2 or away from it. Any solutions and units known from prior art can be used for drive and control of the displacement drive 23.

Figure 2:
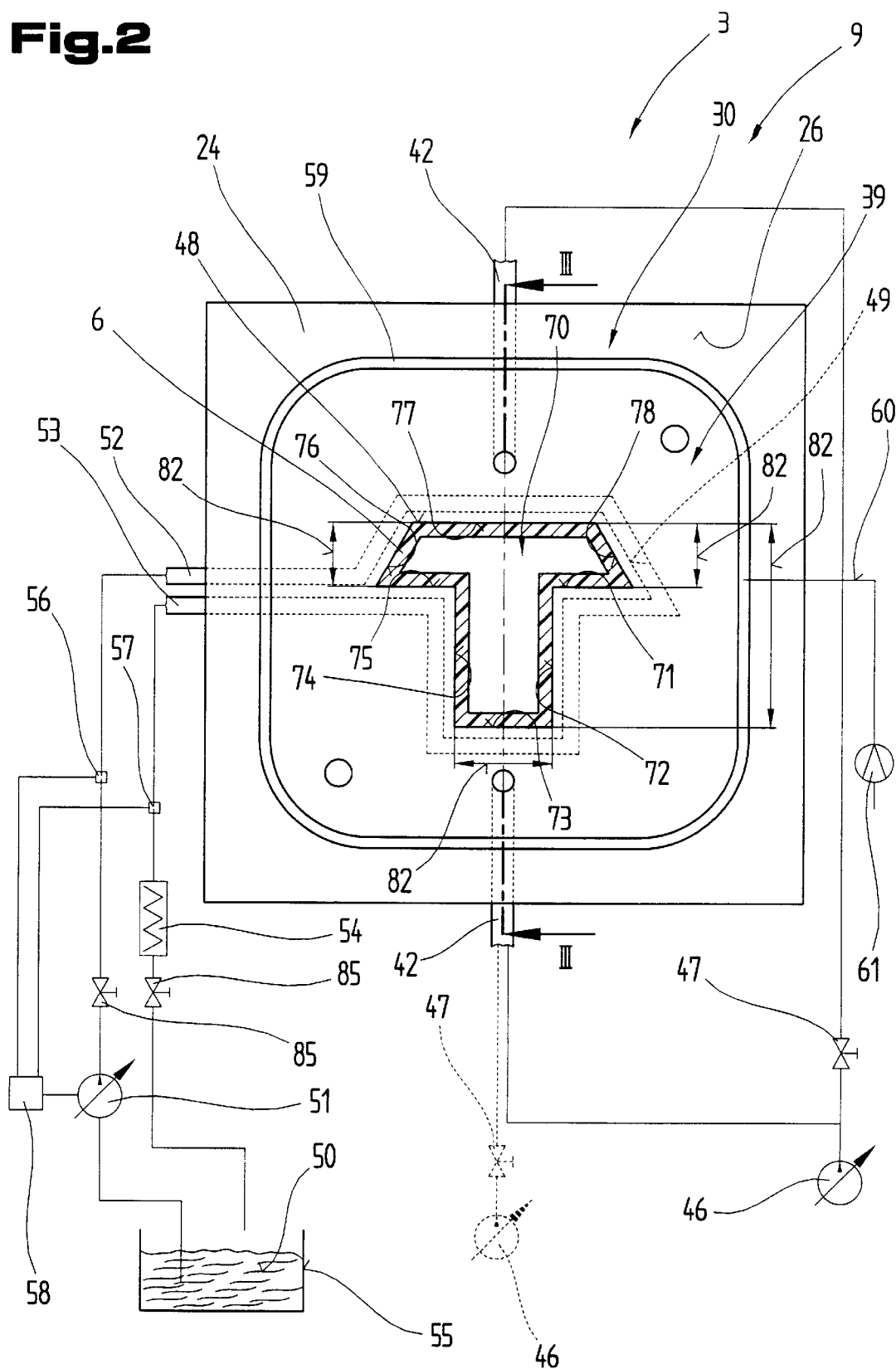
FIG. 2: the shaping device according to the invention in end view, in cross-section along lines II—II in FIG. 1 and in a simplified schematic illustration.
Figure 3:
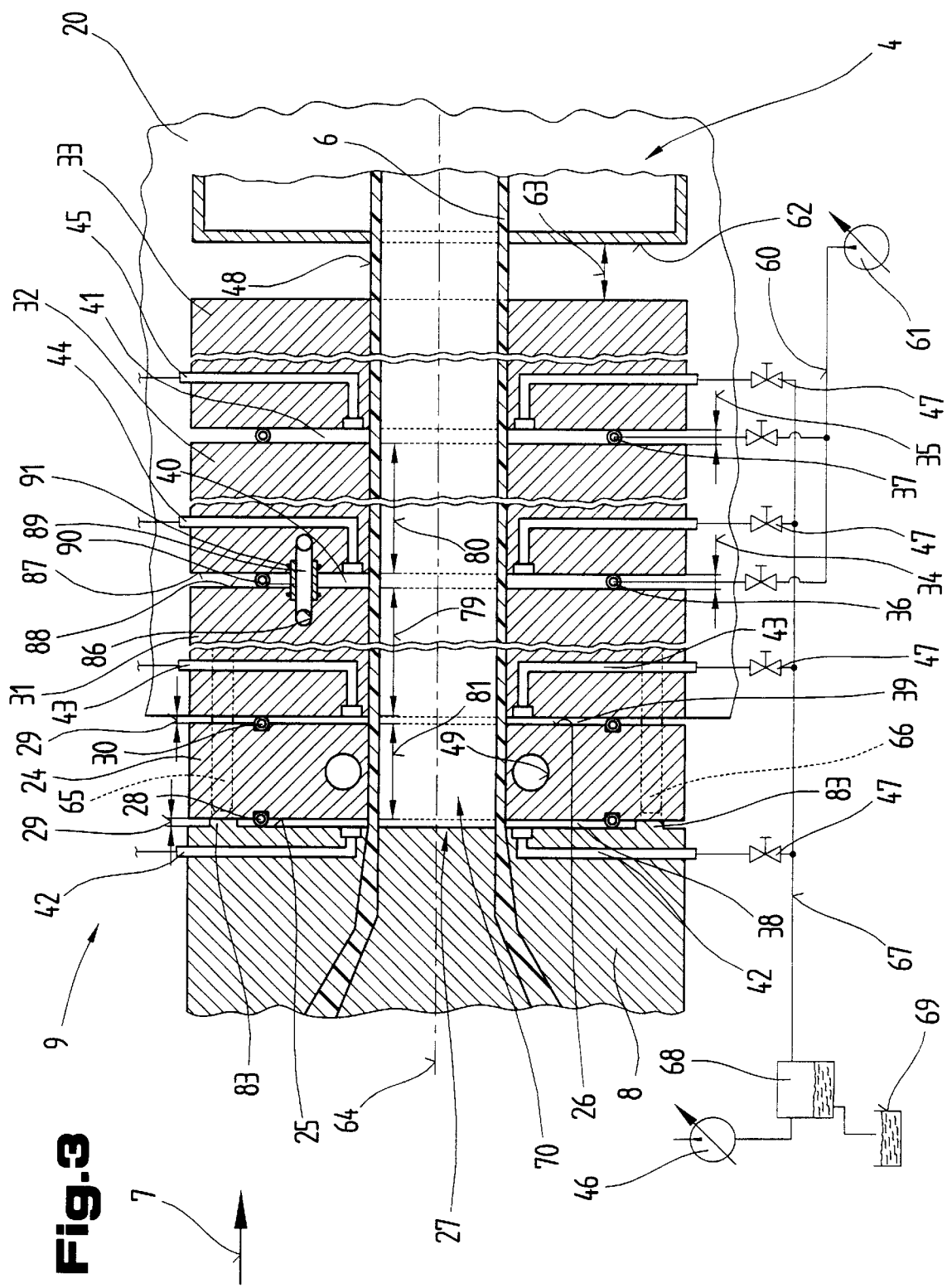
FIG. 3: the shaping device according to FIG. 2 in side view, in cross-section along lines III—III in FIG. 2.
Figure 4:
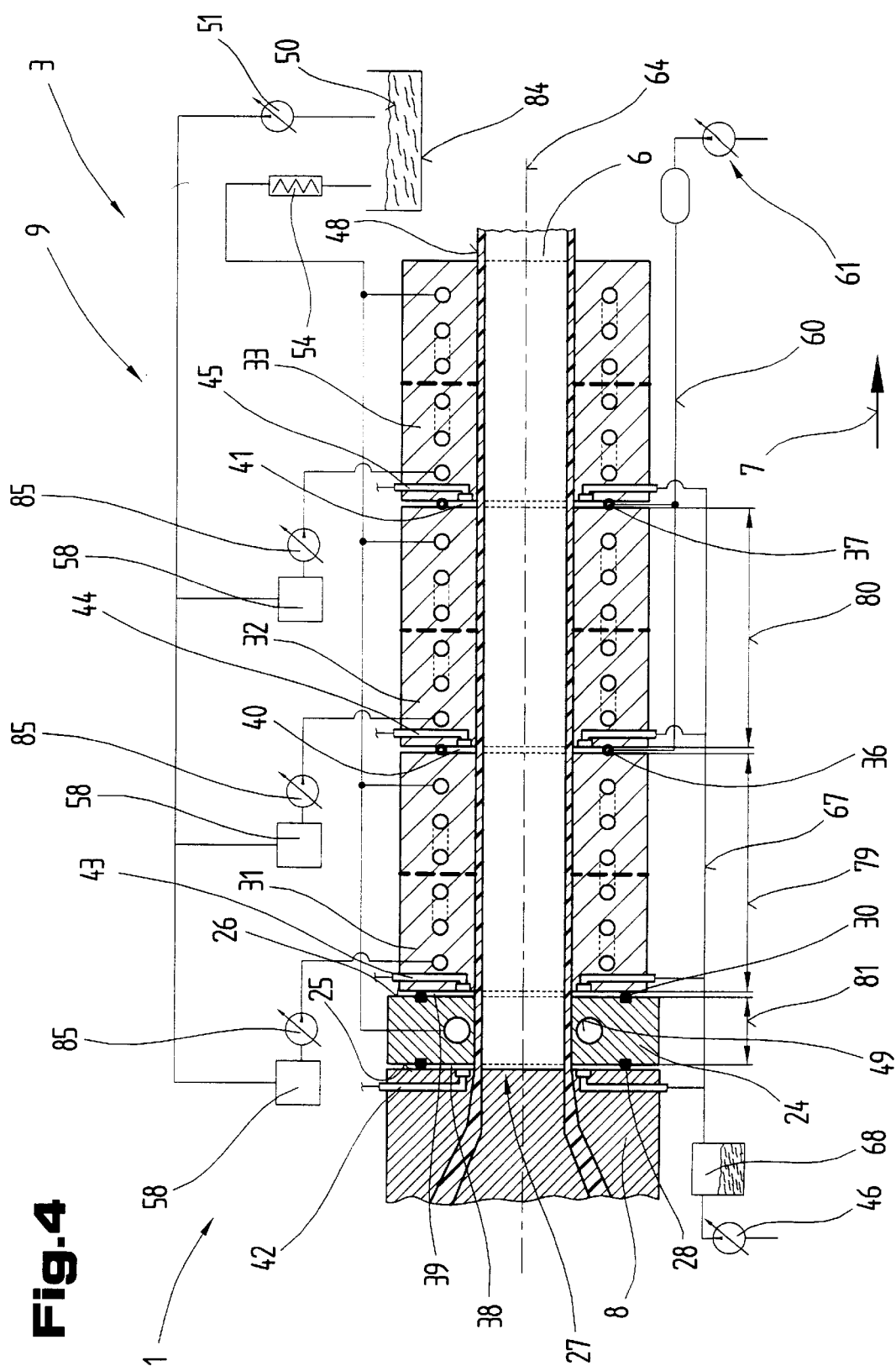
FIG. 4: a further and if necessary independent embodiment of the shaping device according to FIG. 3 in side view, in cross-section and in simplified scheatic view.

As shown in FIGS. 2 to 4, in this embodiment the extruder tool 8 is immediately followed by a calibrating tool 24 of the calibrating device 9, the calibrating tool 24 being secured preferably in a floating manner, yet exactly accurate to axis on the devices or tools of the calibrating device 9 to be described in more detail later, following the calibrating tool 24 in the extrusion direction, arrow 7. The calibrating tool 24 is thus a component part of the calibrating device 9 and has end faces 25, 26 aligned vertically to the extrusion direction, arrow 7. In this case the end face 25 is facing a nozzle lip 27 or end face of the extruder tool 8 and located at a distance 29 from the nozzle lip 27 by means of a preferably sealing spacer member 28. The end face 26 of the calibrating tool 24, facing away from the extruder tool 8, follows via a further spacer member 30, which can be of identical size or different from the distance 29 between the end face 25 and the nozzle lip 27, of one of the further calibrating tools 31 to 33 of the calibrating device 9, in the extrusion direction, arrow 7. These further calibrating tools 31 to 33 are located one behind the other respectively in the extrusion direction, arrow 7, at intervals 34,35 and are secured on the calibrating table 20. Between the individual calibrating tools 31 to 33, there are spacer members 36,37, preferably designed as seal members.

In the outlet area of the calibrating tool 33, the extruded article 6 emerges without a large interspace into the cooling device 4, which can if necessary also serve as a calibrating device and at that point is then cooled by the cooling devices known from prior art. This can be brought about either by previously known water baths or spray baths or similar known arrangements. Preferably, calibration of the article 6 by means of the calibrating plates 10 indicated in the area of the cooling device 4, is carried out in this cooling device 4, as can be seen from the book by Michaelis or other publications in prior art, e.g. DE 195 04 981 A1, EP0 659 536A2 and EP0 659 537 A2 or U.S. Pat. No. 3,473,194 A or DE 19 23 490 A, DE 22 39 746 A and EP 0 487 778 B1.

By means of using the spacer members 28 and 30,36 and 37, cavities 38 to 41 surrounding the article 6 are provided between the extruder tool 8 and the individual calibrating tools 24 and 31 to 33. These cavities 38 to 41 are connected to lines 42 to 45, via which these cavities 38 to 41 can be evacuated to a low pressure beneath the environmental pressure, i.e. air pressure. For this purpose the individual lines 42 to 45 can be respectively connected with their own vacuum generator 46 or a vacuum generator 46 common to all cavities 38 to 41. In the latter case, if a common vacuum generator 46 is used for all cavities 38 to 41, low-pressure regulating units 47 can be located between it and the individual cavities 38 to 41, so that for example the individual cavities 38 to 41 are evacuated to a more intense vacuum as the distance from the nozzle lip 27 increases. In order to enable compaction of at least one surface 48 of the article 6 during passage of the article 6 through the calibrating device 9, the calibrating tools 24 and 31 to 33 are cooled.

For this reason, as FIG. 2 shows, they are provided with a cooling duct 49, through which a temperature treatment means 50 can be passed. The temperature treatment means 50 for this purpose is passed by a circulating pump 51 to the cooling duct 49 via an inlet 52. The temperature treatment means 50, heated by cooling of the article, emerges again from the calibrating tool 24 at an outlet 53. The temperature treatment means 50 emerging from the outlet 53 can, particularly when a closed temperature treatment system is involved, be cooled to the desired temperature and passed to a tank 55 for the temperature treatment means 50. The quantity of temperature treatment means 50 passed by the circulating pump 51 through the cooling duct 49 can be produced, by means of measurement detectors 56,57, e.g. for determining pressure and/or temperature of the temperature treatment means 50 with reference to the temperature difference and/or pressure difference in the feed and return line for the temperature treatment means 50, for which purpose the measurement detectors 57 can be connected by a control device 58 to the circulating pump 51. Supply of the further calibrating tools 31 to 33 with a temperature treatment means 50 is possible via the central circulating pump 51 or can also be provided for each of the calibrating tools 24,31 to 33 via its own circulating pump 51 with a closed or open circulating system for the temperature treatment means 50. For the case where only one central circulating pump 51 is provided, with reference to the following illustrations, the connection of the individual cooling ducts 49 is shown through the cavities 38 to 41. Thus the temperature of the temperature treatment means 50 can be less than 40° C., but preferably 20° C.

The spacer member 30, which seals the cavity 39 around the article 6 from the surrounding air or the external air, is shown in particular in FIG. 2. This spacer member 30 in the present case is formed by an inflatable hollow seal profile 59 with a hollow chamber. Therefore the hollow chamber of this hollow seal profile 59 communicates via a pressure line 60 to a pressure supply 61, such for example as a source of compressed air, a pressurised fluid such for example as water, oil or other preferably incompressible media, which ensures even with the low pressure obtaining in the cavity 39, an air-tight seal with a fluctuating distance 29. These alterations in distance can be required by the heat expansions of the material of the calibrating tools 24,31 to 33 occurring due to temperature alterations, or to differing pressure conditions in the area of the individual cavities 38 to 41. The individual spacer members 30,36,37 or the hollow seal profile 59 form a surrounding seal device in the area of the cavities 38 to 41 between the article 6 and the external air or environmental air, and are preferably formed to be of low heat conductivity, and/or elastically deformable.

Naturally, the spacer member 28 may also be formed by a welded hollow chamber seal or by a seal of solid material such for example as sponge rubber or polyurethane or the like.

The article 6 emerging out of the last calibrating tool 33 in the extrusion direction, arrow 7, can then enter either directly, if necessary by sealing from the environmental air, such as between the individual calibrating tools 24, 31 to 33 through an end wall 62 into the cooling device 4, or these can be located at a pre-settable longitudinal spacing 63 in the extrusion direction, arrow 7, behind the last calibrating tool 33.

While the calibrating tools 31 to 33 are aligned towards one another on the calibrating table 20 or upon support units located thereon in terms of height and side, and with reference to the medial longitudinal axis 64 of the article 6 are in a centred location, in the present case the calibrating tool 24 is located displaceably on guide pillars 65,66 in the extrusion direction, arrow 7, aligned to the medial longitudinal axis 64 of the article 6, and projecting beyond the calibrating tool 31 in the direction of the calibrating tool 24. The calibrating tool 24 located in this way in the extrusion direction, arrow 7, in a floating manner on the guide pillars 65,66 can be positioned by displacing the calibrating table 20 along the guide rail 22 in the direction of the extruder 2, so that a sealing closure of the cavities 38,39 from the environmental air is achieved via the spacer members 28,30. When the calibrating tool 24 is secured on the calibrating tool 31, care should be taken that the latter is at least axially movably mounted with respect to the calibrating tool 31. The individual cavities 38 to 41 can also be termed slots or air passages, which in these embodiments serve as vacuum slots for shaping the article 6.

As may further be seen in particular from FIG. 3 and schematically indicated therein, there may be interposed between a suction pipe 67 from the cavity 38 or the line 42 to the vacuum generator 46 a separator 68 with a subsequent catchment container 69. By virtue of the fact that directly following the nozzle lip 27 a cavity 38 is provided under partial vacuum, the article 6, particularly a whole profile, emerging from the nozzle lip 27, is inflated by the applied pressure of the environmental air in the interior of the hollow profile, i.e. air pressure, and receiving its final shape, is brought into a calibrating chamber 70, which is formed by mould surfaces 71 to 78, FIG. 2, and which serve to profile and calibrate the surface 48 of the article 6. In this additional squeezing procedure in which the material 12 of the article 6 has for contact still substantially its extrusion temperature, lubricant residues contained in the material 12 are expressed or flushed out.

These lubricant residues have previously been deposited in the slots or vacuum slots in the calibrating tools 24,31 to 33 and led to smear formation in the area of the surface 48 of the article 6.

By virtue of the fact that these are now precipitated or expressed in a hot, liquid form, particularly in the cavity 38 and if necessary also in the cavity 39, they can be extracted simultaneously with the extraction of the air in order to maintain the vacuum in the cavities 38,39, can be separated in the separator 68 by the air extracted by the vacuum generator 46 and can be collected in a catchment container 69 for disposal or re-use.

In this respect it proves advantageous if the line 42 is led from the cavity 38 to the suction pipe 67 in the extrusion tool 8, which is heated and kept at a high temperature, as then the extracted residues cannot condense or solidify and thus can be perfectly extracted. It is in fact also possible to lead the line 43, as shown in the area of the calibrating tool 31, in the latter, yet it is recommended in this case if necessary, in order to avoid excessively intense cooling of the components to be extracted due to the cooling of the calibrating tool 31 by the temperature treatment means 50, to provide the line 43 if necessary opposite the calibrating tool 31 with a heat insulation or to heat it separately with an inserted heating spiral.

The form of procedure for manufacturing an article for its calibration in direct conjunction with the nozzle lip 27 is now as follows:

The usually pulverulent or granular material 12 plasticised in the extruder 2 is plasticised by the squeezing and shearing procedures in the region of the extruder worms of the extruder 2 with simultaneous application of heat energy, and is passed via various deflection distribution ducts and mixing and heat treatment zones of the nozzle lip 2 in a mould roughly adapted to the cross-sectional shape of the article 6 to be produced, into the area of the nozzle lip 27, and is shaped therein to the desired cross-sectional shape of the article 6. In this case a cross-sectional surface of the nozzle lip 27, surrounded by the face edges of the external mould surfaces of the extrusion tool 8, is of such dimensions that said nozzle lip is smaller than a cross-sectional surface surrounded by the mould surfaces 71 to 78 of the calibrating tool 24 immediately following the extrusion tool 8, in the entry area of the calibration tool 24. Shrinkage of the article 6 occurring during cooling is likewise to be taken into account in establishing the individual cross-sectional surfaces, starting from the nozzle lip 27 as far as the outlet region from the calibrating device 9.

The article 6, plasticised and having no intrinsic rigidity, emerging from the nozzle lip 26, particularly in the case of hollow profiles, enters the cavity 38 and at that point is exposed to the vacuum applied here, which is built up by the vacuum generator 46, and due to the pressure effect of the air in the interior of the hollow profile, i.e. the normal outer air pressure, relative to the low pressure in the cavity 38, is normally inflated by an extent of 0.1 mm to 0.4 mm. Thereupon this expanded article runs into the calibrating chamber 70 of the first calibrating tool 24. By means of the intake of material as it runs into the calibrating chamber 70 and the shaping thereby achieved, or the lubricants and additives deposited during the last shaping before emergence of the article from the nozzle lip 27, lubricants and additives deposited on the surface of the article 6 to be shaped are passed by the vacuum applied in the cavity 38 with the extracted air through the line 42 of the suction pipe 67 located in the heated extrusion tool 8, from which point they pass into the separator.

Immediately after entry into the calibrating chamber 70, the article 6 is smoothed in the area of its surface 48 by means of the smooth continuous mould surfaces 71 to 78, and stabilised by the low temperature of the mould surfaces 71 to 78 by the cooling with the heat treatment means 50 in the desired cross-sectional shape by cooling of the material in the direction of the hardening or gasification temperature. By means of passing through the cavity 39 following the calibrating tool 24, the outer surfaces or surfaces 48 of the article 6 which have not yet sufficiently hardened are pressed outwards by the excess pressure exerted from the interior of the article 6 in the case of the hollow profile, in order thus to suppress or remove tensions arising by means of the cooling already initiating by means of webs or the like lying in the interior of the article 6. Thereafter the profile runs in this now final desired external form along a lengthy path 79 from mould surfaces 71 to 78 which are smooth and continuous and not provided with apertures or recesses, to the next cavity 40. During this gentle, unaffected passage, the surface 48 of the article 6 is now extremely intensively cooled due to the cooling of the calibrating tool 31 with the heat treatment means 50, so that it becomes capable of supporting load at least in the uppermost edge zones of its cross-section. After a repeated expansion of the article 6 as it passes through the cavity 40, the article 6 again passes through the mould surfaces 71 to 78 of the calibrating tool 32 and thus covers a path 80, which roughly corresponds to the path 79. Thereafter, the article 6, rigidified to this extent in the region of its surface layer, can be passed to the following cooling device 4 or to a further cavity 41 in which the profile is again subjected to reduced pressure, and a further calibrating tool 33 of this cooling device 4. The individual paths 79 to 81, covered by the article 6 passing through the calibrating tools 24, 31 to 33, also correspond to the individual lengths of the calibrating tools 24, 31 to 33 and thus also to the individual mould surfaces 71 to 78.

In order to produce a perfect surface of such articles 6, it has proved advantageous if the paths 79,80 and thus the length of the mould surfaces 71 to 78 at least of the calibrating tools 31 to 33, comes to about 200 mm. A path 81 and thus a length of the mould surfaces 71 to 78 of the calibrating tool 24 on the other hand can come to only a fraction, e.g. between 10% and 50% of the path 79, 80 of the calibrating tools 31 to 33. Preferred is a path 81 for the calibrating tool 24 of between 20 mm and 70 mm, e.g. 30 mm, and a path 79,80 for the calibrating tools 31 to 33 of between 200 mm and 250 mm, preferably 235 mm.

Depending on the wall thickness of the article 6 or of the required freedom from tension, two or even more calibrating tools 31 to 33 can be disposed in succession in the extrusion direction in order to calibrate an article 6.

In order to take account of the contraction of the article 6 during its continuous passage through the calibrating device 9, a distance 82 between mould surfaces facing one another 77 and 73 or 75 and 77 or 71 and 77 or mould surfaces 72 and 74 or 76 and 78 can be smaller with increasing spacing of the calibrating tools 24 and 31 to 33 from the extrusion tool 8.

In order to maintain a minimum distance 29 or a minimum spacing 34,35 between the various cavities 38 to 41, it can prove advantageous above all in the case of elastically deformable spacing members 28,30 in the extrusion direction, arrow 7, and particularly in the case of inflatable seal devices or seal devices of elastomers, to provide end stops 83, which ensure minimum distances or spacings.

FIG. 4 shows an arrangement in which each of the individual calibrating tools 24 and 31 to 33 is connected with its own coolant supply, i.e. its own tank 84 and a circulating pump 51. Control of the supply of heat treatment means to the individual calibrating tools 24, 31 to 33 is effected via a control device 58 and through control valves 85 or individual intermediate pumps.

It may further be seen from this Figure that the low pressure in the two cavities 38,39 between the extrusion tool 8 and the calibrating tool 24 immediately following it in the extrusion direction, arrow 7, or the next calibrating tool 31 after this in sequence, is built up by its own vacuum generator 46, which is preceded by a separator 68. Then, as already described with reference to FIGS. 1 to 3, lubricants and additives occurring in these areas can be removed from the surface area of the workpiece 6. As is clearly seen from this view, a path 81 of the calibrating tool 24 or of the mould surfaces 71 to 78 is smaller than 70%, preferably smaller than 30% of the lengths of the paths 79,80 of the calibrating tools 31 to 33 or their mould surfaces 71 to 78. In various cases of application it may even prove advantageous if the path 81 of the calibrating tool 24 comes to only about 15% of the paths 79,80 of the calibrating tools 31,32. The paths 79 to 81 can however also preferably come to a multiple, e.g. 7 to 30 times, preferably 20 times, the distance 29 or the spacing 34,35.

A preferred length of the path 81 comes to 30 mm, while the paths 79,80 come to 235 mm and the distance 29 and the spacings 34,35 come to roughly between 1 mm and 15 mm.

In this connection it can also prove advantageous if the length of the mould surfaces 71 to 78 of the calibrating tools in the extrusion direction, arrow 7, i.e. the paths 79 to 81, increases with the increasing spacing of the calibrating tool 31 to 33 from the extrusion tool 8.

As is also shown schematically by way of example in FIG. 4, it is naturally possible for the heat treatment means 50 to be passed not only through a calibrating tool 24,31 to 33, but through a plurality of these calibrating tools, the heat treatment means 50 then being fed into one of the calibrating tools 24,31 to 33 and being removed from another calibrating tool 24,31 to 33 to a heat-exchanger 54 and the tank 55. The continued passage of the heat treatment means 50 from one calibrating tool to another in the extrusion direction, arrow 7, can be carried out, as shown on a larger scale schematically in FIG. 3, in that, in a cooling duct 86, heat treatment means 50 is transferred via bores 89 aligned concentrically and vertically to the end faces 87 and 88 facing one another of the calibrating tools 31,32. In order to seal the transition, so that the latter permits a relative movement at all times with a sealed further passage of the heat treatment means 50, the two bores 89 are connected to a transition sleeve 90, which is inserted with a press fit into the bores 89 or transition bores with a larger diameter If the press or force fit is insufficient to provide a seal on the basis of the relative movement with respect to temperature alterations between the calibrating tools 31,32, a seal of the transition sleeve 90 can also be provided by O-rings 91 or the like in the individual calibrating tools 31,32.

Figure 5:
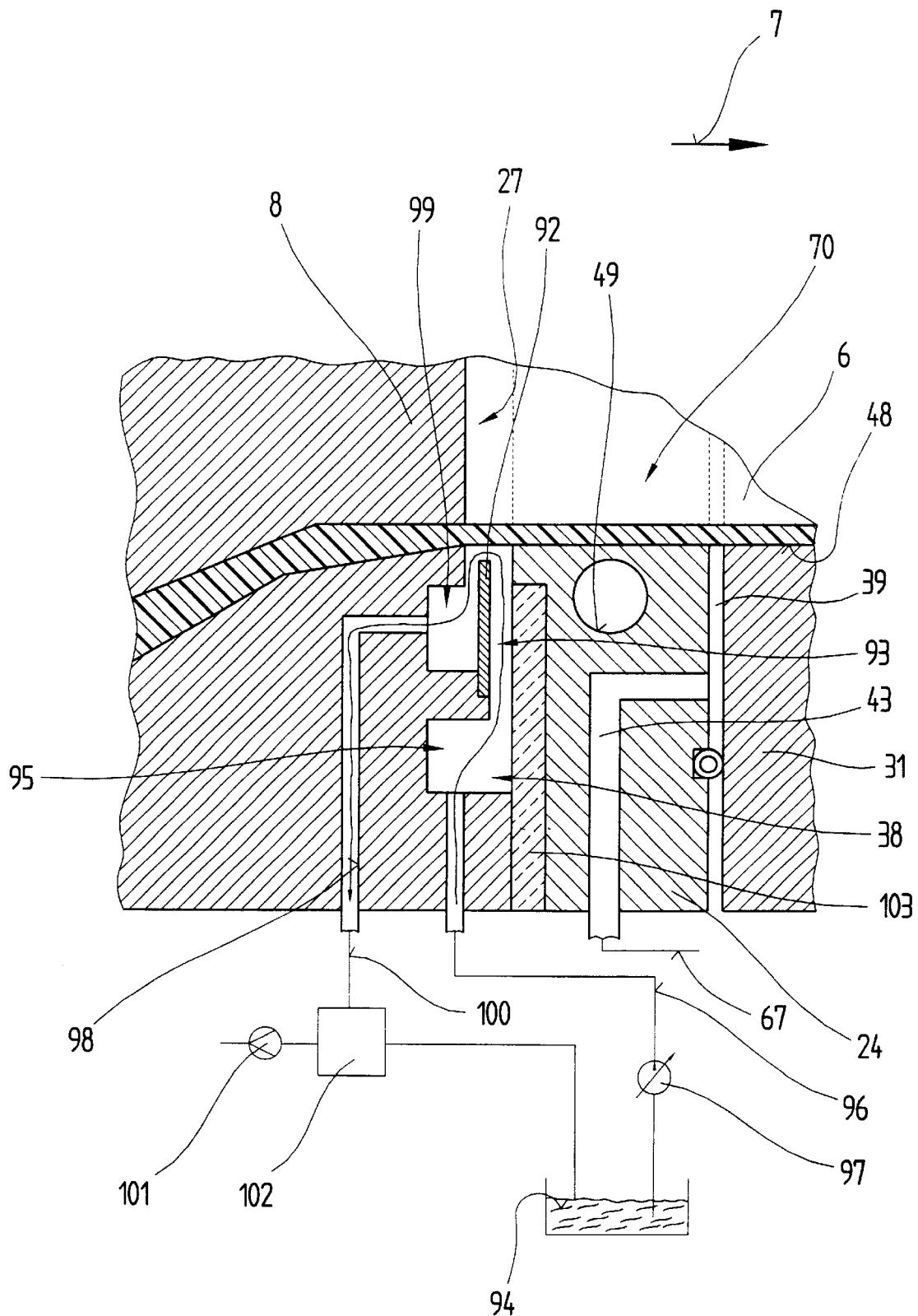
FIG. 5: another and if necessary independent transition zone according to the invention between the extruding tool and the calibrating tool immediately following it, in side view, in cross-section on a larger scale and in a schematic, simplified illustration.

In FIG. 5 a portion of the transition zone between the extrusion tool 8 and the first calibrating tool 24 following it in the extrusion direction, arrow 7, is shown on a larger scale. Located between the extrusion tool 8 and the calibrating tool 24 is a cavity 38. A guide plate 92 projects into this cavity 38 from the side relating to the extrusion tool 8. Between this guide plate 92 and the calibrating tool 24 a feed duct 93 for a preferably liquid flushing agent 94 is formed, which is connected via a transverse duct 95 or inlet to a conveyor line 96, which is for example acted on by a flushing agent pump 97. A suction line 98 in the extrusion tool 8 is connected on the side facing the cavity 38 via a connection cavity 99 with the cavity 38. On the side facing away from the extrusion tool 8, the suction pipe 98 is connected via an inward suction pump 100 to a vacuum pump 101 with an interposed regenerating device 102 for the flushing agent 94, in which the residual materials, such as lubricants, additives or the like, which have been flushed out by the flushing agent 94, and which are expressed or washed out or diffused out in the cavity 38 from the surface 48, are separated. The flushing agent pump 97, the vacuum pump 101 and the regenerating device 102 with the feed and suction pipes 96,100 associated therewith, represent a supply system located outside the shaping device 3.

Naturally it is also possible in the construction described above to form any other cavity 39 to 41 in such a form that removal of any residues such as lubricants and additives and the like, from the surface 48 of the article 6 is made possible.

In addition, as shown schematically, the feed duct 93 can be separated by an insulating member 103 from the calibrating tool 24. By means of disposing the conveyor line 96 and the transverse duct 95 predominantly in the heated extrusion tool 8, the flushing agent 94 fed in by the flushing agent pump 97 is heated, and at that point passes into the region of the surface 48 of the article 6 which is continually moving past, and with sufficient inflow pressure or high extraction power, can flush off lubricants and other additive materials contained on the surface. In this respect the flow direction of the flushing agent 94 is selected to be contrary to the extrusion direction, arrow 7. This emulsion comprising the substances flushed out with the flushing agent 94 can be removed in common with the air extracted to form a vacuum, in order to shape the article 6 via the vacuum pump 101, through the suction pipe 100, and can be separated in a regenerating device 102. By virtue of the fact that the connecting cavity 99 and the suction pipe 98 are likewise disposed in the heated extrusion tool 8, these lubricant additives and other material additives cannot be deposited in the lines, but are properly removed.

The design of the further cavities 39 to 41 and their possible evacuation via the lines 43 to 45, in conjunction with the suction pipe 67, can be effected in accordance with the description in the preceding Figures.

By means of a corresponding shaping of the nozzle lip 27 and of the calibrating chamber 70, a corresponding build-up of the material 12 for the article 6, or an additional squeezing of the material in the cavity 38 can also be provided in a forced manner, so that the removal of the lubricants and other additives, which normally diffuse out on the surface 48, is reinforced or effected in an automatic manner. It is however also possible to use the flushing agent 94 in a gaseous form and thus likewise to ensure removal of the lubricants and additives.

Figure 6:
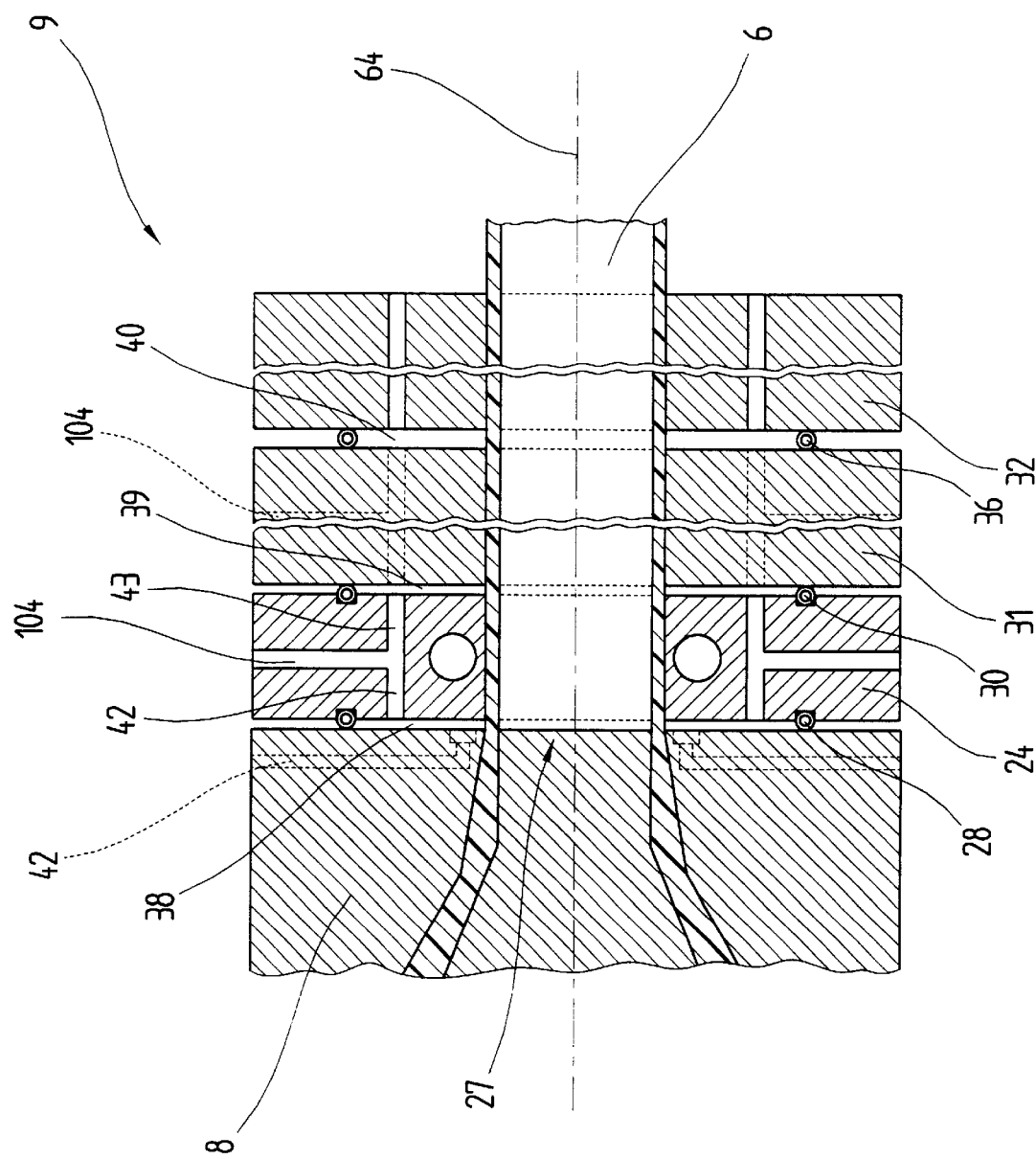
FIG. 6: a further and if necessary independent transition zone according to the invention between the extruding tool and two calibrating tools immediately following in the extrusion direction, of another shaping device according to the invention, in side view, in cross-section on an enlarged scale and in a schematic, simplified illustration.

FIG. 6 shows a variant construction of a calibrating device 9, in which only three calibrating tools 24,31 and 32 are located in connection to the extrusion tool 8. The extraction pipe for producing a vacuum in the cavity 39 between the calibrating tool 24 and 31 is in this case located in the cross-sectional area of the calibrating tool 24. The line 42 for producing a vacuum in the cavity 38 can be located instead of the arrangement in the extrusion tool 8, as shown in dotted lines, in the calibrating tool 24, so that the lines 42 and 43 are connected via a common extraction line 104 with their vacuum generator 46, as already illustrated and described in detail with reference to the preceding embodiments.

If the cavity 38 is connected via the line 42 in the extrusion tool 8 to a vacuum generator 46, it is for example also possible to apply reduced pressure to the two cavities 39 and 40, which are disposed on either side of the calibrating tool 31, via a central extractor line 104, as shown in dotted lines.

In this way, above all in the case of an arrangement of a plurality of calibrating tools disposed in succession, it is only necessary to produce corresponding connecting ducts in order to build up a vacuum in the cavities 38 to 41 in every second one.

Figure 7:
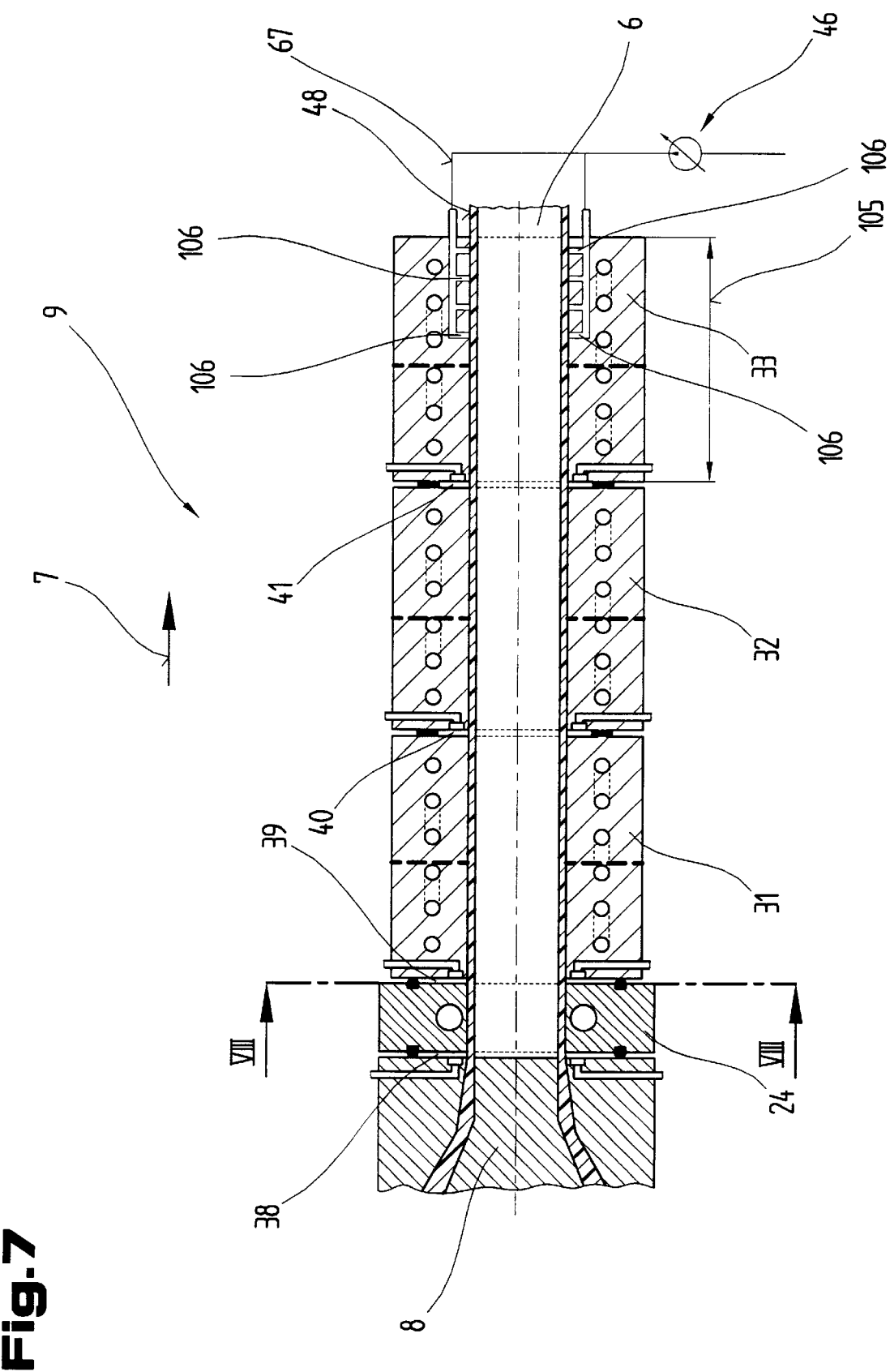
FIG. 7: another and if necessary independent variant construction of a shaping device according to the invention with air passages located in the calibrating tools for connection to a vacuum source, in side view and in section.

FIG. 7 shows schematically that the cavities 38 to 41 between the calibrating tools 24,31 to 33 can be sealed by rigid seals, for example copper or ceramic seals. This schematic view also shows that in the calibrating tool 33 most remote from the extrusion tool 8, there are located one after the other at least over a portion of the length of the mould surfaces 71 to 78 or of a path 105 of this calibrating tool 33, vacuum slots 106 or air passages in the extrusion direction, arrow 7. The individual vacuum slots 106 or air passages are connected via a suction pipe 67 to a vacuum generator 46 which is shown schematically. Such a design is above all recommended for workpieces which are provided with a plurality of cross-webs lying in the cavity, in order to prevent the work piece from contracting in an uncontrolled manner and thus losing its dimensional stability after emerging from the last calibrating tool 33.

It is advantageous in this respect that, due to the length of the preceding smooth continuous mould surfaces 71 to 78 in the calibrating tools 24,31 to 33, and the extensive cooling of the surface 48 of the article 6, scarcely any further residues of lubricants or additives are separated at the surface 48 of the article 6, so that the surface quality of the article 6 in this area is not disadvantageously influenced and in addition blockage of these vacuum slots 106 by such solvent residues is avoided.

FIG. 8 again shows a calibrating tool 31 of the calibrating device 9 in an end view similar to FIG. 2, for which reason the same reference numbers are used for identical parts.

Figure 8:
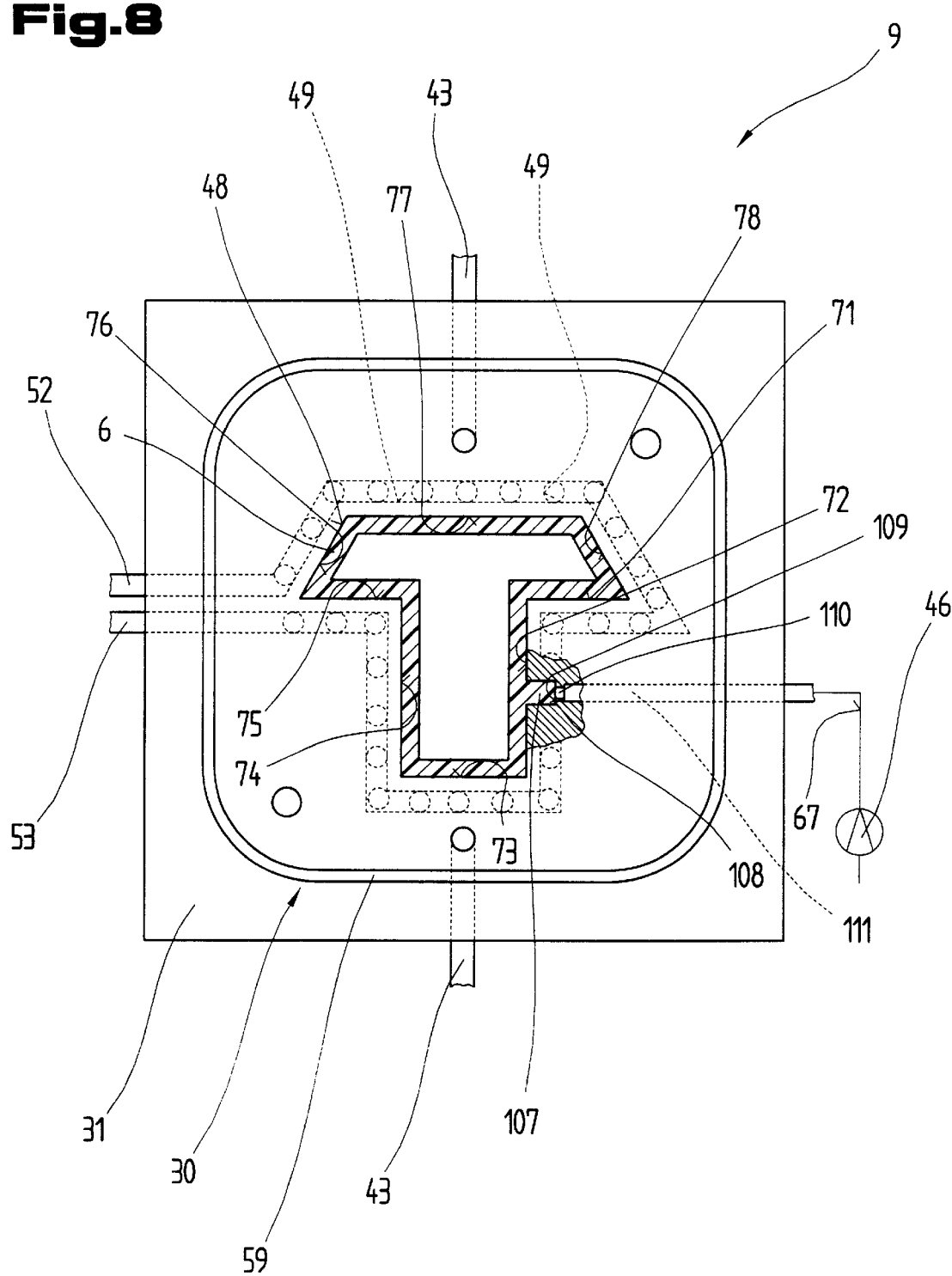
FIG. 8: a further and if necessary independent embodiment of a shaping device according to FIG. 7, in end view and in partial section along the lines VIII—VIII.

The calibrating tool 31 shown in FIG. 8 differs from that shown in FIG. 2 in that, for a small portion of the surface 48, particularly in the area of a web 107 projecting over the outer peripheral surface of the article 6, particularly in a mould surface 109 facing its end surface 108, a vacuum slot 110 or air passage is disposed, which can be connected via a connecting duct 111 or a suction pipe 67 to a vacuum generator 46. This vacuum slot 110 can now be disposed over only a partial area of the path 79 of the mould surfaces 71 to 78, or a plurality of such vacuum slots 110 or air passages can be disposed behind one another in the longitudinal direction of the path 79.

It is however also possible, instead of the shown arrangement, in which the vacuum slot 110 extends parallel to the extrusion direction, arrow 7, for this vacuum slot 110 or a plurality of vacuum slots 110 disposed in succession over the mould surface 109 in the extrusion direction, arrow 7, to extend obliquely to the extrusion direction, arrow 7. The arrangement of such small vacuum slots 110, above all in the area of unstable thin projections, also enables in the area of these thin projections Or smaller grooves, exact maintenance of the desired outer dimensions and complete shaping of these outer areas of the article 6. As the proportion of the surface of such projections or grooves or the like is usually very small, i.e. lies below 10% of the overall surface of the article 6 or of the individual mould surfaces 71 to 78, this has no disadvantageous influence on the quality of processing of the article 6 over the remaining area.

In this embodiment it also proves advantageous if the cooling ducts 49 extend parallel to the extrusion direction, arrow 7, through the calibrating tools 31 to 33. It is also advantageous if the through-flow of the heat treatment agent 50 is contrary to the extrusion direction, arrow 7.

Naturally the individual embodiments described above and the variants and differing constructions shown in these embodiments can each in themselves form independent solutions according to the invention, and may be combined with one another at will. This preferably relates to the arrangement of the calibrating tool 24 in conjunction with the extrusion tool 8 and of the individual calibrating tools 31 to 33 with one another.

Above all, the individual constructions shown in FIGS. 1;2;3;4;5;6;7,8 can form the subject-matter of independent solutions according to the invention. The objects and solutions according to the invention relating to this are to be seen from the detailed descriptions of these Figures.

What is claimed is:

1. A shaping deice for an extrusion system, comprising:
   a calibrating device having a plural of calibrating tools arranged one after another along an extrusion direction in which an extruded article travels through the calibrating device, each calibrating tool having an upstream end face and a downstream end face and mould surfaces extending between the upstream and downs end faces for contacting outer surfaces of the extruded article passing through the calibrating tool, each calibrating tool further including cooling ducts for passage of a heat-treatment agent therethrough; and at least one seal device disposed between the downstream end face of at least one calibrating tool and the up end face of an immediately succeeding calibrating tool, the seal device being structured and arranged to maintain a space in the extrusion direction between the respective end faces between which the seal device is disposed so as to create a cavity surrounding the extruded article that is closed off from environmental pressure outside the calibrating device, whereby said cavity can be evacuated to a reduced pressure relative to said environmental pressure.

2. The shaping device of claim 1, wherein a length of the mould surfaces of each calibrating tool in the extrusion direction is at least seven times a length of said space between the end faces of adjacent calibrating tools.

3. The shaping device of claim 1, wherein each calibrating tool includes a passage therethrough opening into one of the cavities defined between the calibrating tool and an adjacent one of the calibrating tools, whereby each cavity is evacuated to said reduced pressure.

4. The shaping device of claim 3, further comprising a vacuum generator connected to the passage of each calibrating tool.

5. The shaping device of claim 4, further comprising a separator disposed between the vacuum generator and the passages of the calibrating tools for separating liquid lubricant that enters the cavities and is suctioned through the passages by the vacuum generator.

6. The shaping device of claim 1, wherein a first one of the calibrating tools and an immediately succeeding second one of the calibrating tools in the extrusion direction are connected by members that allow said first and second calibrating tools to be moved relative to each other in the extrusion direction.

7. The shaping device of claim 1, wherein the at least one seal device comprises an inflatable seal that is inflated by pressurization of the seal device by a fluid, and further comprising a pressure supply system connected with the at least one seal device for inflating the seal device.

8. The shaping device of claim 1, wherein each calibrating tool defines an opening delimited by the mould surfaces for the passage of the extruded article therethrough, and wherein said opening of each calibrating tool is larger than said opening of an immediately succeeding one of the calibrating tools.

9. The shaping device of claim 1, wherein a last of the calibrating tools in the extrusion direction has at least one air passage that opens through one of the mould surfaces of said last calibrating tool, and further comprising a vacuum generator connected with the at least one air passage.

10. The shaping device of claim 1, wherein a length of the mould surfaces of each calibrating tool is greater than a length of the mould surfaces of an immediately preceding one of the calibrating tools.

11. A shaping device for an extrusion system, comprising:
an extrusion tool having an end face;
a calibrating device having a first calibrating tool spaced in an extrusion direction from the extrusion tool, the first calibrating tool having an upstream end face opposing the end face of the extrusion tool and having a downstream end face, the first calibrating tool further including cooling ducts for passage of a heat-treatment agent therethrough and mould surfaces extending between the upstream and downstream end faces defining an opening through the first calibrating tool for passage of an extruded article therethrough; and
a seal device disposed between the end face of the extrusion tool and the upstream end face of the first calibrating tool surrounding the extruded article so as to create a cavity around the extruded article that is closed off from environmental pressure existing outside the shaping device, and wherein the seal device maintains a space between the end face of the extrusion tool and the upstream end face of the calibrating tool in the extrusion direction such that the cavity is delimited by said end face and the seal device.

12. The shaping device of claim 11, further comprising a plurality of said calibrating tools arranged one after another in the extrusion direction with a downstream end face of each calibrating tool opposing an upstream end face of an immediately succeeding one of the calibrating tools, and further comprising a seal device disposed between the downstream end face of at least one calibrating tool and the upstream end face of the immediately succeeding calibrating tool, the seal device being structured and arranged to maintain a space in the extrusion direction between the respective end faces of the calibrating tools between which the seal device is disposed so as to create a cavity surrounding the exuded article that is closed off from environmental pressure outside the shaping device.

13. The shaping device of claim 11, wherein the seal device is an inflatable seal, and further comprising a pressure supply system connected with the seal device for inflating the seal device.

14. The shaping device of claim 11, further comprising a vacuum generator, and a line connected between the vacuum generator and the cavity between the extrusion tool and the first calibrating tool, said line being formed at least partially in the extrusion tool.

15. The shaping device of claim 14, wherein the extrusion tool further includes a slot opening into the cavity for supplying a flushing agent into the cavity, and further comprising a supply system for supplying the flushing agent through said slot into the cavity, the supply system being located outside the shaping device.

16. The shaping device of claim 11, wherein the seal device has a low heat conductivity and is elastically deformable.

* * * * *